US011988023B2

(12) United States Patent
Chen et al.

(10) Patent No.: US 11,988,023 B2
(45) Date of Patent: May 21, 2024

(54) INTELLIGENT ELECTRONIC LOCK

(71) Applicant: Shenzhen Joint Technology Co., Ltd, Guangdong (CN)

(72) Inventors: Zunyan Chen, Guangdong (CN); Jun Chen, Hubei (CN); Lianghong Wu, Guangdong (CN); Jinghui Chen, Guangdong (CN); Fan Liu, Guangdong (CN)

(73) Assignee: Shenzhen Joint Technology Co., Ltd, Shenzhen (CN)

( * ) Notice: Subject to any disclaimer, the term of this patent is extended or adjusted under 35 U.S.C. 154(b) by 486 days.

(21) Appl. No.: 17/342,527

(22) Filed: Jun. 8, 2021

(65) Prior Publication Data

US 2021/0396049 A1 Dec. 23, 2021

(30) Foreign Application Priority Data

Jun. 18, 2020 (CN) .......................... 202010557651.6

(51) Int. Cl.
*E05B 67/00* (2006.01)
*E05B 17/00* (2006.01)
*E05B 17/22* (2006.01)
*E05B 47/06* (2006.01)
*G06K 7/14* (2006.01)
*G07C 9/00* (2020.01)
*G07C 9/22* (2020.01)

(52) U.S. Cl.
CPC ........ *E05B 67/003* (2013.01); *E05B 17/0075* (2013.01); *E05B 17/226* (2013.01); *E05B 47/06* (2013.01); *G06K 7/1417* (2013.01); *G07C 9/00309* (2013.01); *G07C 9/22* (2020.01)

(58) Field of Classification Search
CPC .. E05B 67/003; E05B 17/0075; E05B 17/226; E05B 47/06; G07C 9/22; G07C 9/00309; G06K 7/1417
See application file for complete search history.

(56) References Cited

U.S. PATENT DOCUMENTS

| 4,766,419 | A | * | 8/1988 | Hayward | G07C 1/32 340/545.2 |
| 5,786,759 | A | * | 7/1998 | Ling | E05B 67/006 70/DIG. 49 |
| 6,420,971 | B1 | * | 7/2002 | Leck | G09F 3/0352 340/556 |
| 10,208,505 | B2 | * | 2/2019 | Lim | G06K 7/10297 |
| 2005/0231365 | A1 | * | 10/2005 | Tester | G09F 3/0347 292/307 R |
| 2009/0303046 | A1 | * | 12/2009 | Eckert | E05B 73/0052 340/568.4 |
| 2012/0085134 | A1 | * | 4/2012 | Ezzo | E05B 73/0017 70/15 |

(Continued)

FOREIGN PATENT DOCUMENTS

CN 210349047 U 4/2020

*Primary Examiner* — Mark A Williams

(57) ABSTRACT

The disclosure is an intelligent electronic lock. The intelligent electronic lock includes: an electronic lock shell, a wireless communication module, an instruction input device, the instruction input device is arranged on the electronic lock shell for instruction input, a processor, the processor is connected to the wireless communication module and the instruction input device is connected to receive and send signals, and the electronic rope.

10 Claims, 10 Drawing Sheets

(56) References Cited

U.S. PATENT DOCUMENTS

| | | | |
|---|---|---|---|
| 2012/0144885 A1* | 6/2012 | Mills | E05B 39/005 |
| | | | 70/57.1 |
| 2015/0243146 A1* | 8/2015 | Sayegh | G08B 13/1463 |
| | | | 340/572.8 |
| 2019/0017294 A1* | 1/2019 | Sternlight | E05B 35/105 |
| 2019/0080631 A1* | 3/2019 | Grapsa | G09F 3/0352 |
| 2019/0228601 A1* | 7/2019 | Grzenda | G07C 9/00571 |
| 2021/0241552 A1* | 8/2021 | Jonely | G07C 9/00944 |

* cited by examiner

INTELLIGENT ELECTRONIC LOCK

CROSS-REFERENCES TO RELATED APPLICATIONS

This application claims the priority of Chinese patent application no. 202010557651.6, filed on Jun. 18, 2020, the entire contents of all of which are incorporated herein by reference.

FIELD OF THE DISCLOSURE

The present disclosure relates to the technical field of an intelligent electronic lock, and more particularly, to an intelligent electronic lock.

BACKGROUND

An intelligent electronic lock is a kind of lock used in the fields of containers, tank trucks, etc. Now the intelligent electronic locks on the market generally require manual input of a password. After the input is completed, the unlocking operation can be performed, but there is a manual unlocking operation. The problem is that it is impossible to record who opened the lock, which leads to very troublesome accountability in the event of a problem.

Moreover, the smart electronic locks currently on the market have complicated fixing methods at both ends of the electronic rope, and once the electronic rope is damaged, the entire intelligent electronic lock needs to be replaced, which is quite wasteful.

Therefore, there is an urgent need in the market for a smart electronic lock with a QR code unlocking function that can solve one or more of the above-mentioned problems.

BRIEF SUMMARY OF THE DISCLOSURE

The technical problem to be solved in the disclosure, aiming at the defects of the prior art, provides an intelligent electronic lock.

In order to achieve the above said targets, the technical solution of the disclosure is as follows: the intelligent electronic lock includes: an electronic lock shell, a wireless communication module, an instruction input device, the instruction input device is arranged on the electronic lock shell for instruction input, a processor, the processor is connected to the wireless communication module and the instruction input device is connected to receive and send signals, and the electronic rope.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

In order to make the above objects, features and advantages of the disclosure more obvious and easier to understand, the following describes the specific implementation of the present disclosure in detail with reference to the drawings. In the following description, many specific details are set forth in order to fully understand the present disclosure. However, the present disclosure can be implemented in many other ways than those described here. Those skilled in the art can make similar improvements without violating the connotation of the present disclosure. Therefore, the present disclosure is not subject to limit.

Figure 1:
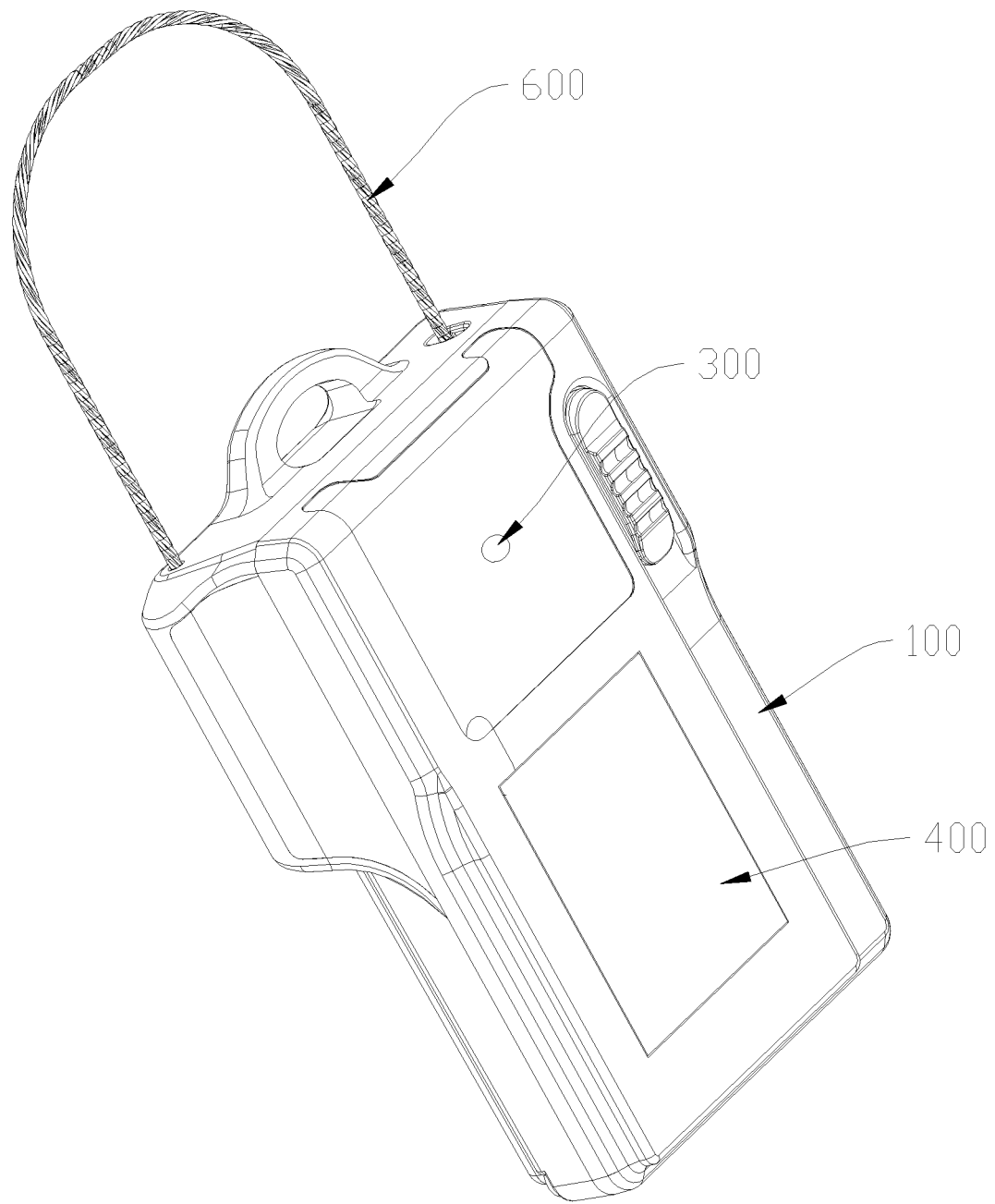
FIG. 1 illustrates a schematic structural diagram of an intelligent electronic lock with a QR code unlocking function according to a disclosed embodiment.
Figure 2:
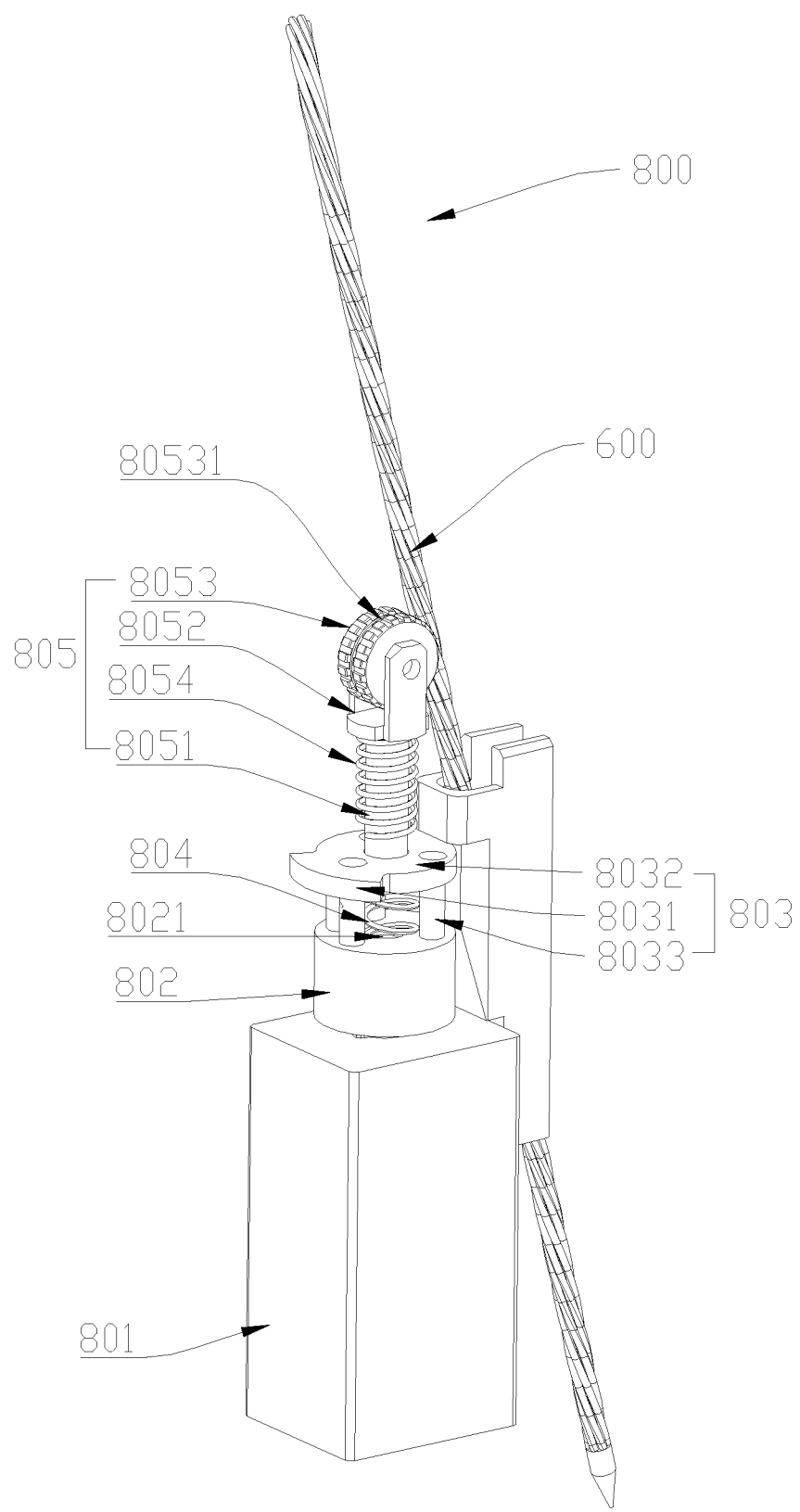
FIG. 2 illustrates a schematic diagram of a movable end connection structure of the intelligent electronic lock with a QR code unlocking function according to the disclosed embodiment.
Figure 3:
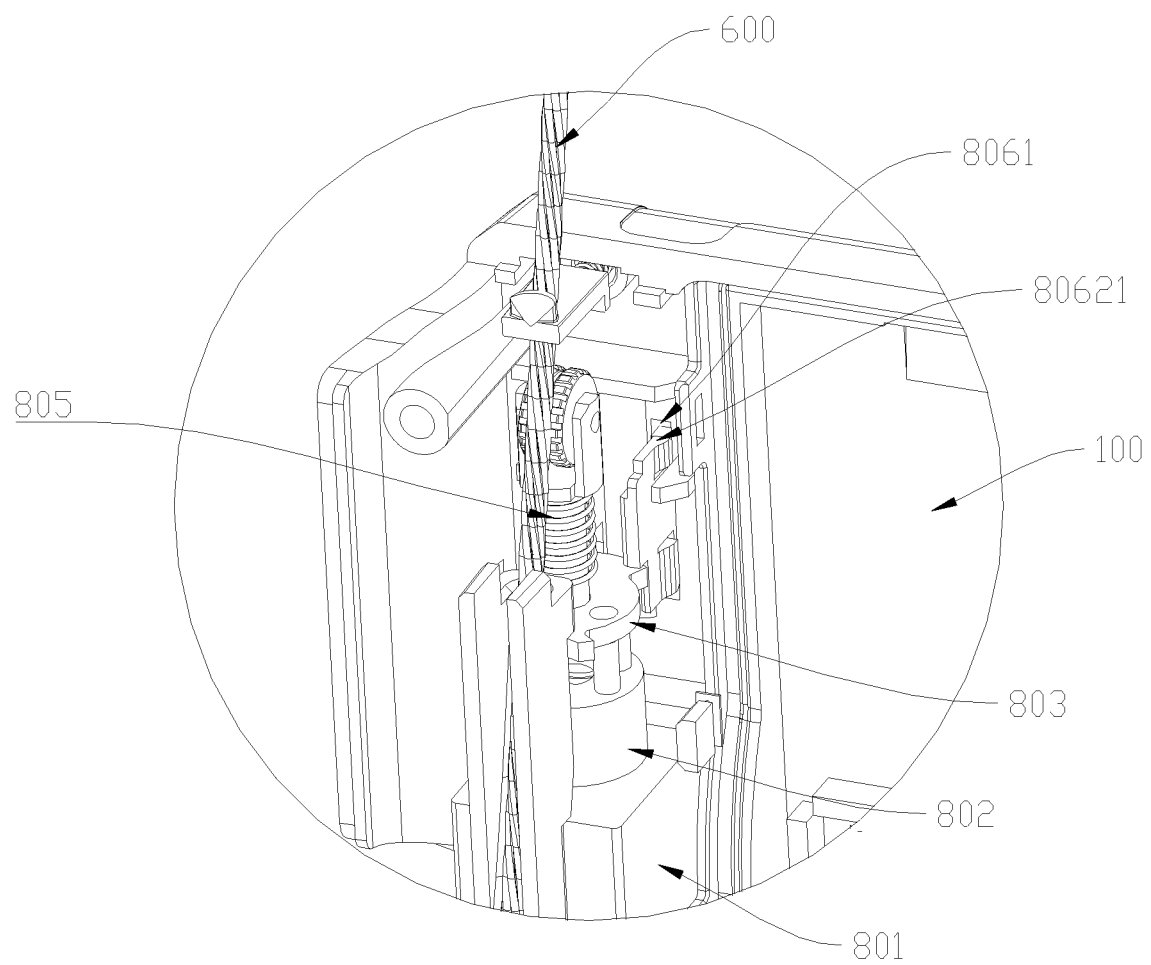
FIG. 3 illustrates a partial connection diagram of the movable end connection structure of the intelligent electronic lock with a QR code unlocking function and the electronic lock shell in the disclosed embodiment.
Figure 4:
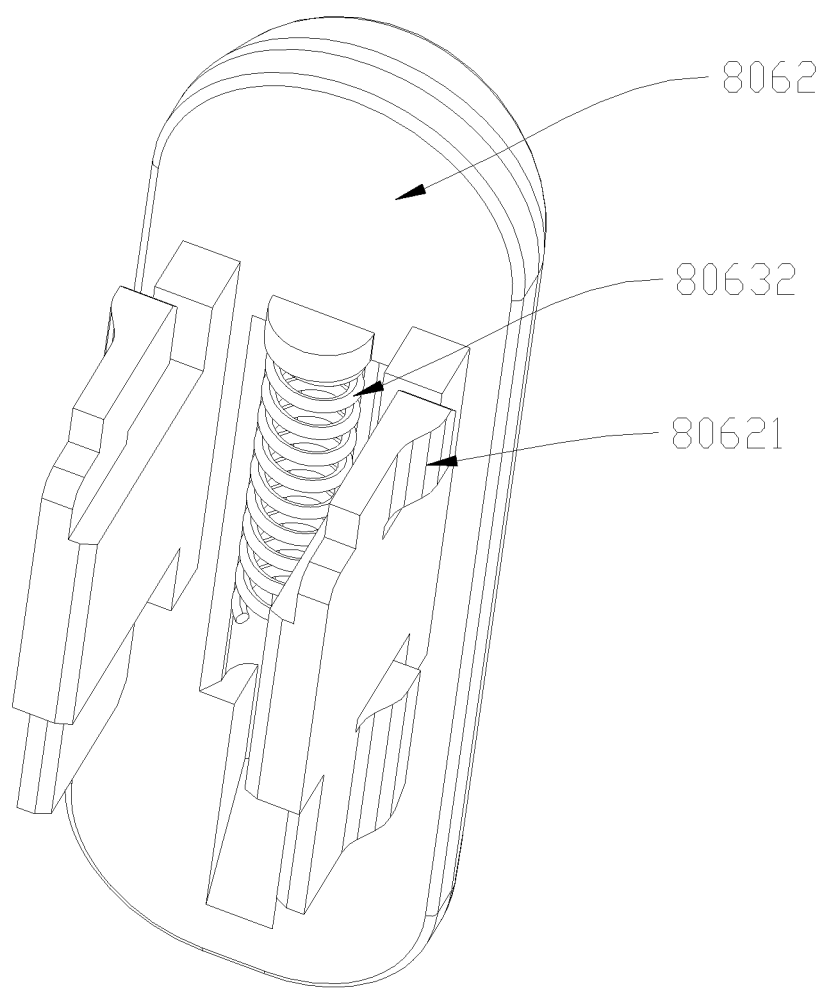
FIG. 4 illustrates a schematic structural diagram of the sliding slider in the movable end connection structure of the intelligent electronic lock with a QR code unlocking function according to the disclosed embodiment.
Figure 5:
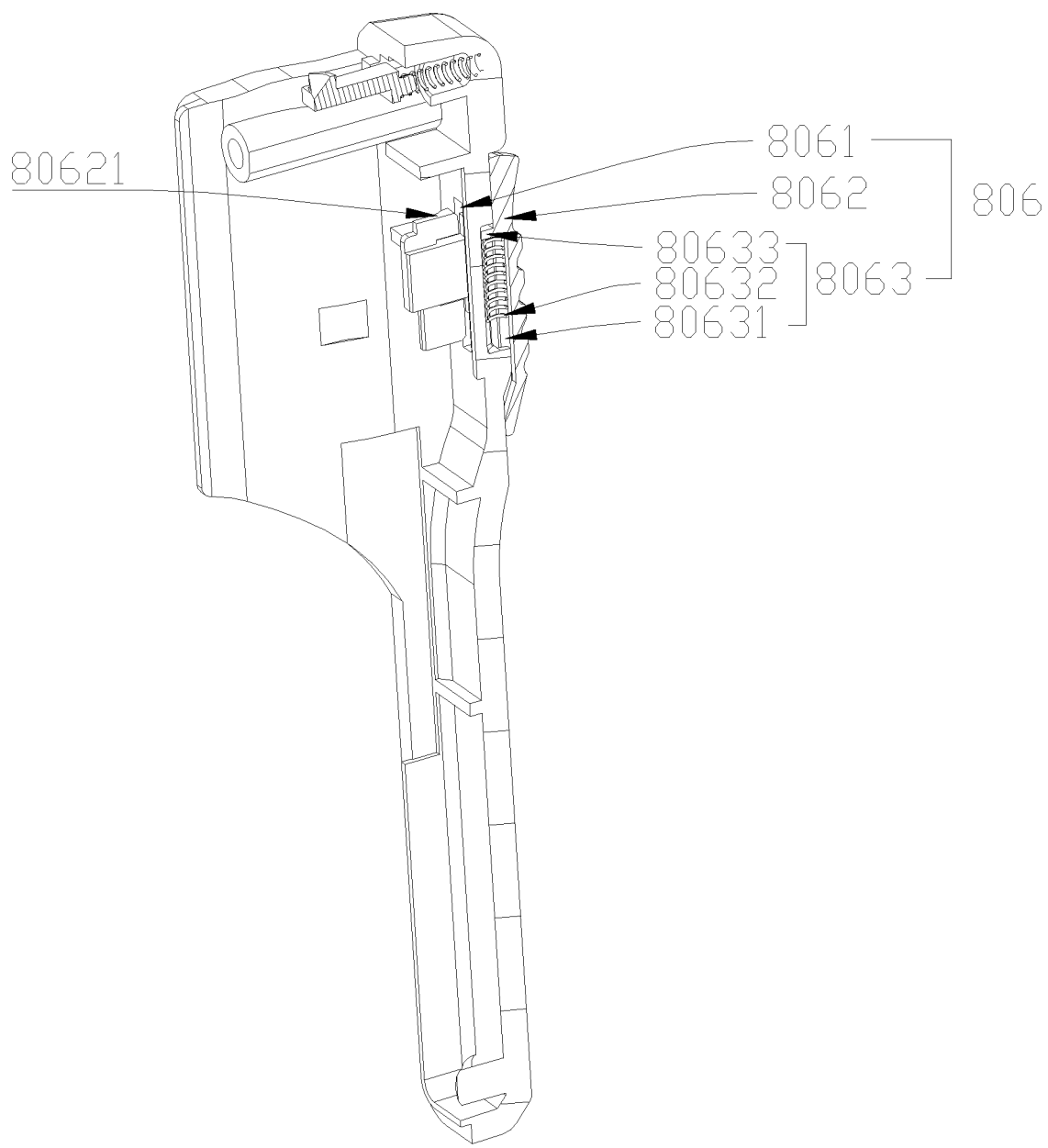
FIG. 5 illustrates is a cross-sectional view of the toggle device in the movable end connection of the intelligent electronic lock with a QR code unlocking function according to according to the disclosed embodiment.
Figure 6:
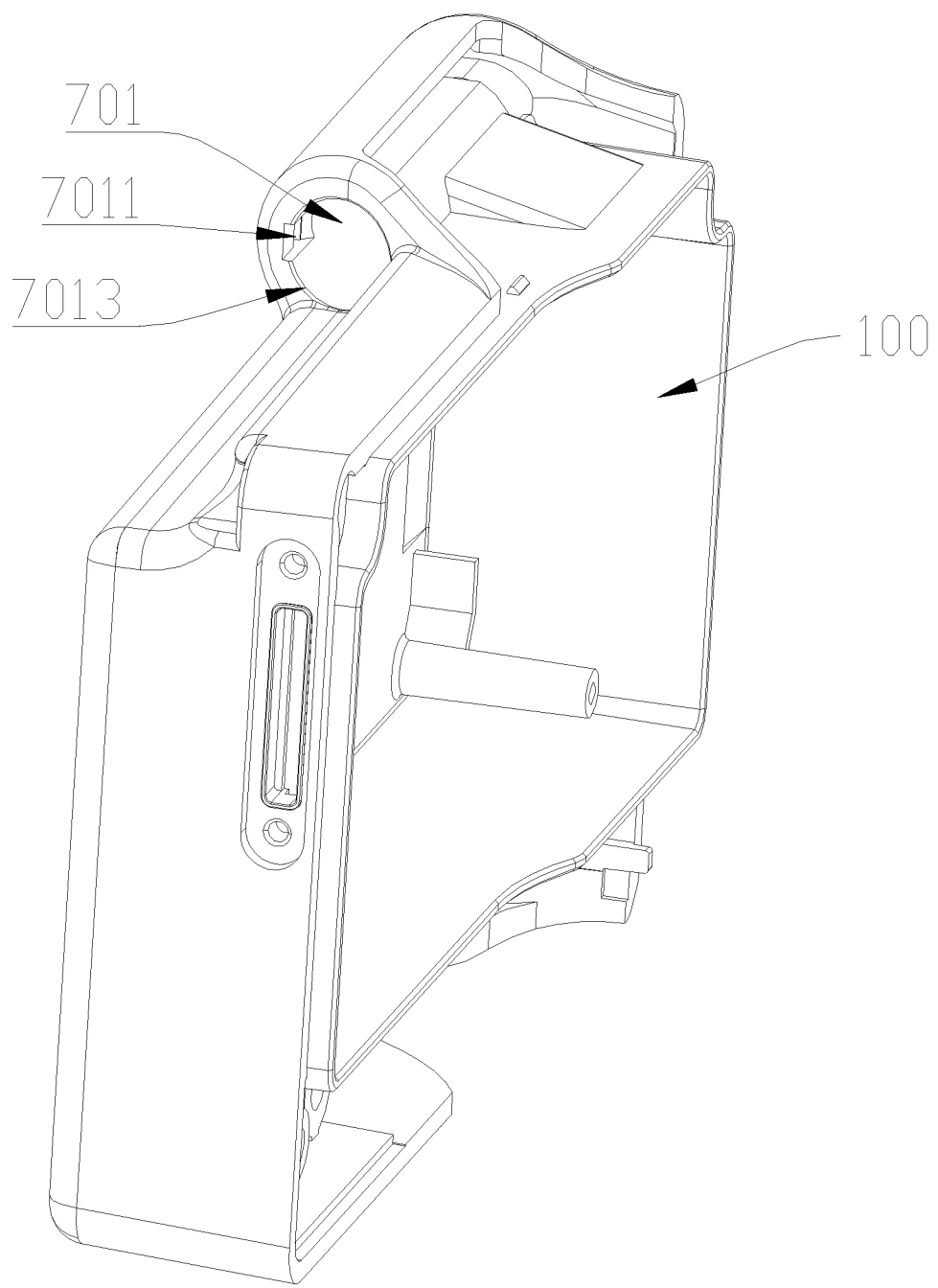
FIG. 6 illustrates a schematic structural diagram of a fixed cavity in a fixed end connection structure of the intelligent electronic lock with a QR code unlocking function according to the disclosed embodiment.
Figure 7:
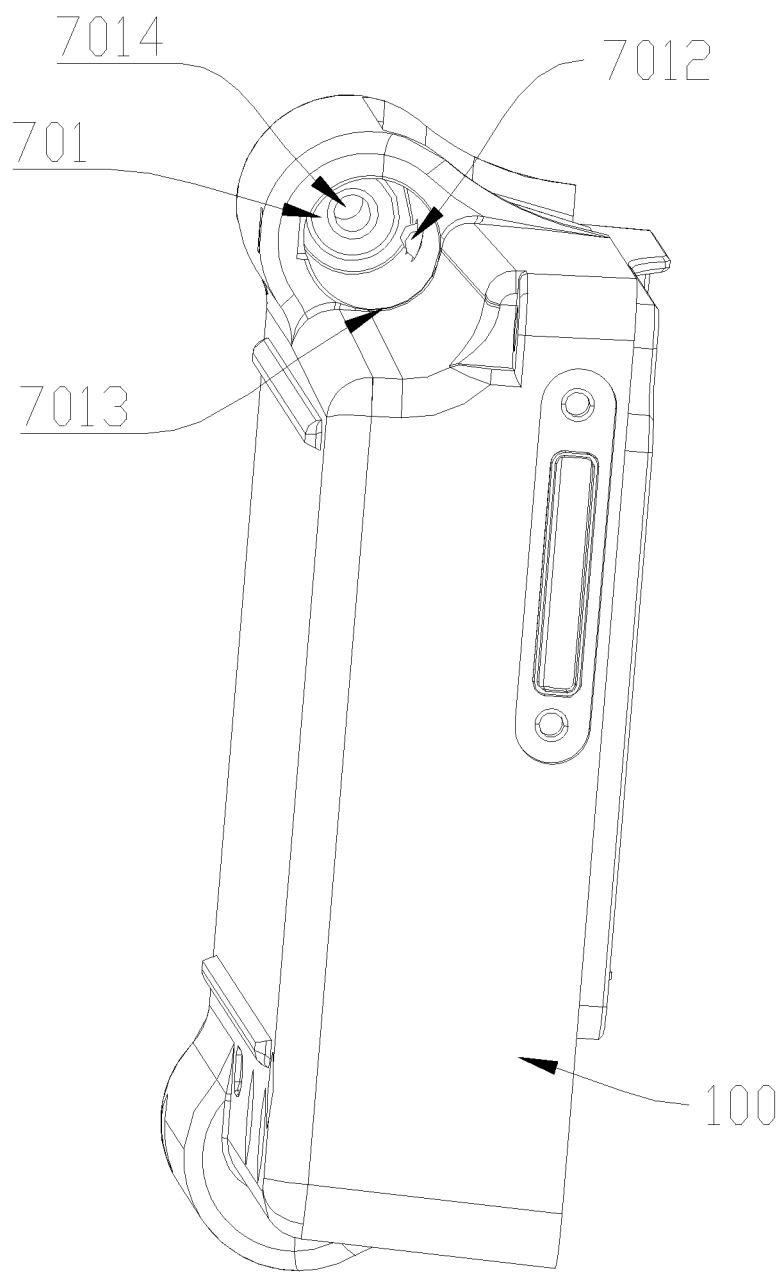
FIG. 7 illustrates a schematic structural view of another angle of the fixed cavity in the fixed end connection structure of the intelligent electronic lock with the QR code unlocking function according to the disclosed embodiment.
Figure 8:
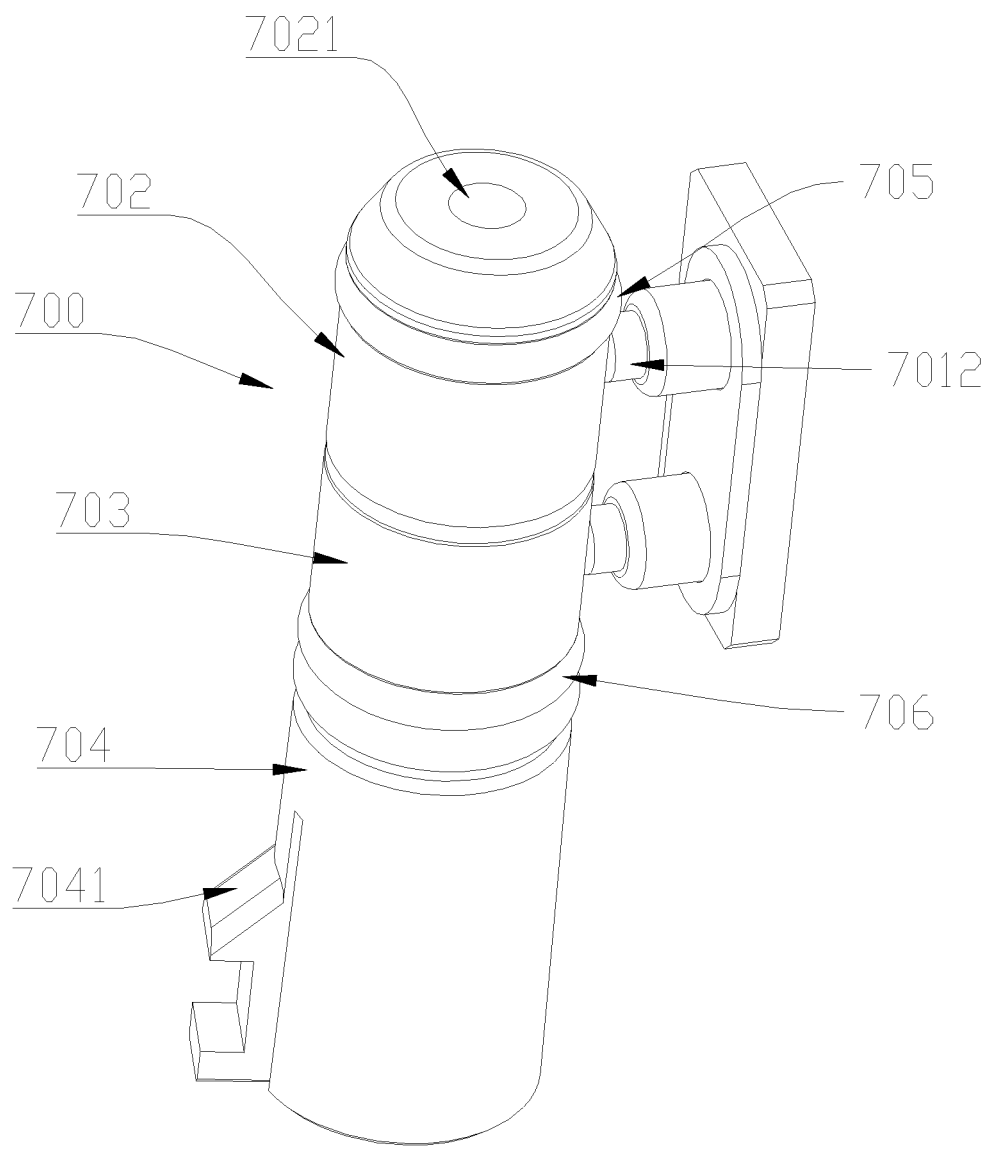
FIG. 8 illustrates is a schematic structural diagram of the connection structure of the fixed end of the intelligent electronic lock with a QR code unlocking function according to the disclosed embodiment.
Figure 9:
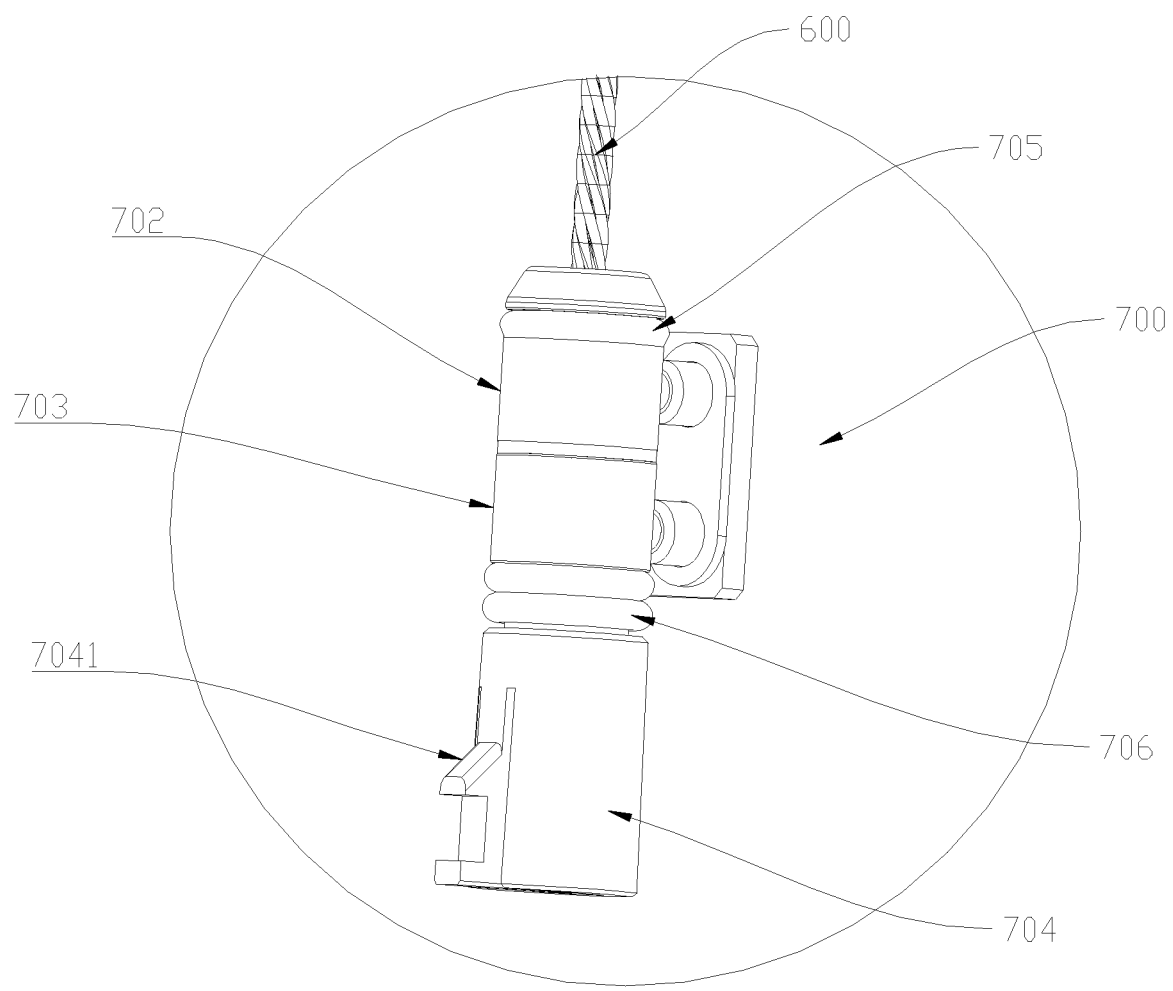
FIG. 9 illustrates a schematic structural diagram of the connection state of the fixed end connection structure and the electronic rope in the intelligent electronic lock with a QR code unlocking function according to the disclosed embodiment.
Figure 10:
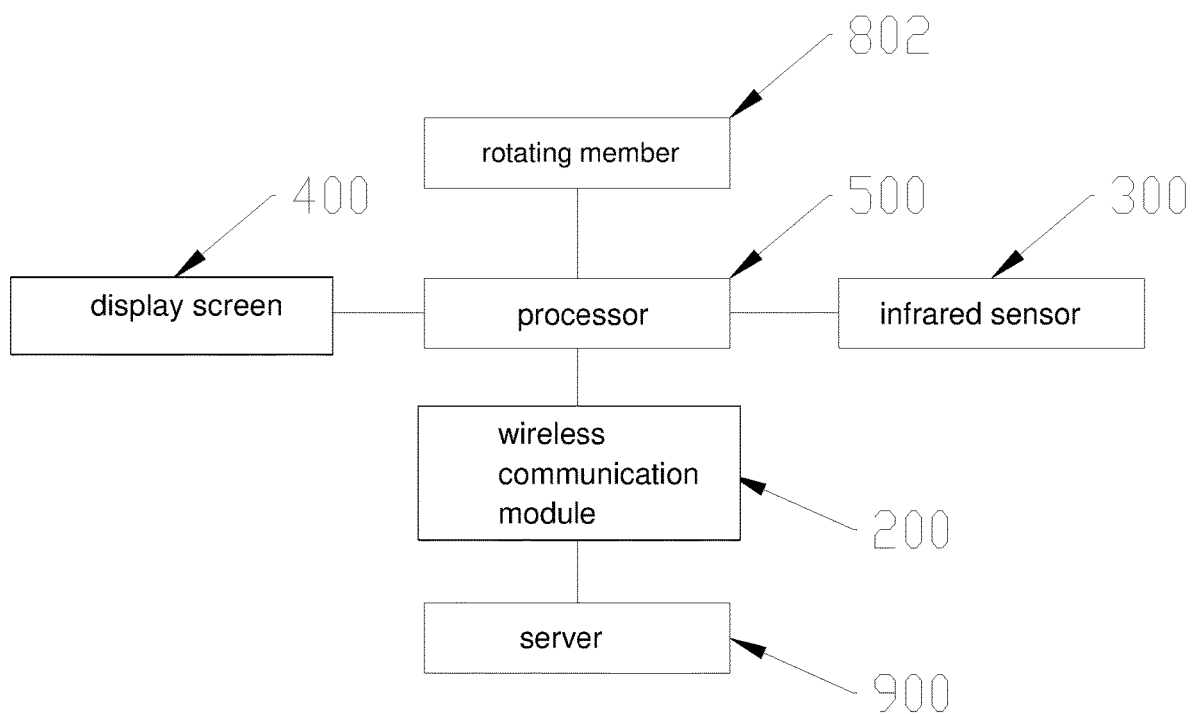
FIG. 10 illustrates a schematic block diagram of the intelligent electronic lock with a QR code unlock function according to the disclosed embodiment.

As shown in FIGS. 1-10 of the present disclosure provides an intelligent electronic lock with a QR code unlocking function. The intelligent electronic lock includes:

an electronic lock shell 100,
a wireless communication module 200, the wireless communication module 200 is arranged in the electronic lock shell, and is used for data wireless communication,
an infrared sensor 300, which is arranged on the electronic lock shell 100 and is used for sensing infrared signals,
a display screen 400, which is set on the electronic lock shell 100 and is used to display a QR code,
a processor 500, the processor 500 is connected to the wireless communication module 200, the infrared sensor 300, and the display screen 400 for signal reception and transmission, and
an electronic rope 600, the electronic rope 600 being arranged on the electronic lock shell 100 and connected with the processor 500,
one end of the electronic rope 600 is connected to the electronic lock shell 100 through a fixed end connection structure 700, and the other end is connected to the electronic lock shell 100 through a movable end connection structure 800, Specifically, this solution adopts the design of the infrared sensor 300. When it is necessary to unlock, simply shake the palm in front of the infrared sensor 300 to wake up the display screen 400, and a QR code will appear on the display screen 400, scan the QR code, at the time, you need to download a corresponding app, scan the QR code through the app, and unlock operation in the app after scanning the QR code. If the person who scans the QR code has no permission, the lock cannot be unlocked. If there is permission, once the lock is unlocked, the information of the user can be recorded in the background, and at the same time, the record is uploaded to the server 900 through the wireless communication module 200 for archiving.

It should be noted that when scanning the QR code, even if there is no Internet, you can unlock the lock. The app will first store the user's information in the phone. When you go to a place with an Internet, you can send the information to the server 900, that is, realize offline unlocking.

It should also be noted that the electronic lock also has anti-cutting function. When the electronic rope 600 is cut, the signal of the violent cut can be sent to the server 900 through the wireless communication module 200, and the server 900 can know the latest information. For the structure of the electronic rope 600, please refer to the patent number 201921303979.4, and the patent name is a disclosure patent for an electronic lock rope and an electronic seal using the electronic lock rope, so the structure of the electronic rope 600 will not be repeated here.

The disclosure is the intelligent electronic lock, which includes:
  an electronic lock shell 100,
  a wireless communication module 200, the wireless communication module 200 is arranged in the electronic lock shell, and is used for data wireless communication,
  an instruction input device (not shown in figs), which is arranged on the electronic lock shell and is used for instruction input,
  a processor 500, which is connected to the wireless communication module and the instruction input device for signal reception and transmission, and
  an electronic rope 600, the electronic rope 600 being arranged on the electronic lock shell 100 and connected with the processor 500,
  one end of the electronic rope 600 is connected to the electronic lock shell 100 through a fixed end connection structure 700, and the other end is connected to the electronic lock shell 100 through a movable end connection structure 800, Specifically, the instruction input device in this solution is generally a password input interface or a display screen. If it is a password input interface, then only the corresponding password needs to be input to complete the unlocking purpose. If it is a display screen, as long as the display screen is awakened, a QR code will appear on the display screen. When scanning the code, you need to download a corresponding app, and scan the QR code through the app. After scanning the code, Unlock the lock in the app. If the person who scans the code has no permission, the lock cannot be unlocked. If there is permission, once the lock is unlocked, the background can record the information of the user, and at the same time, upload the record to the server through the wireless communication module.

It should be noted that when scanning the QR code, even if there is no Internet, you can unlock the lock. The app will first store the user's information in the phone. When you go to a place with an Internet, you can send the information to the server 900. Archive, that is, realize offline unlocking.

It should also be noted that the electronic lock also has anti-cutting function. When the electronic rope 600 is cut, the signal of the violent cut can be sent to the server 900 through the wireless communication module 200, and the server 900 can know the latest information. For the structure of the electronic rope 600, please refer to the patent number 201921303979.4, and the patent name is a disclosure patent for an electronic lock rope and an electronic seal using the electronic lock rope, so the structure of the electronic rope 600 will not be repeated here.

The movable end connection structure 800 includes:
  a driving device 801, the driving device 801 is arranged in the intelligent electronic lock, a rotating member 802, the rotating member 802 is in transmission connection with the driving device 801,
  a telescopic member 803, the telescopic member 803 is arranged on the rotating member 802, can rotate together with the rotating member 802, can reciprocate along the height direction of the rotating member 802, and the telescopic member 803 and the rotating member 802 cannot be completely separated, a toggle block 8031 extending outward is provided on the side of the telescopic member 803,
  a first compression spring 804, the first compression spring 804 is arranged between the rotating member 802 and the telescopic member 803, and applies a force to the rotating member 802 and the telescopic member 803 to keep the rotating member 802 and the telescopic member 803 away,
  a clamping device 805 is rotatably connected to the telescopic member 803 and can reciprocate along the height direction of the rotating member 802 with the telescopic member 803. When the clamping device 805 is pushed up, it cooperates with the electronic rope 600 to apply a pressure to the electronic rope 600 so that the electronic rope 600 cannot be pulled out, and
  a toggle device 806, which is movably arranged on intelligent electronic lock shell 100 and cooperates with the toggle block 8031 to move the toggle block 8031 downwards, so that the clamping device 805 is separated from the electronic rope 600.

Specifically, when the intelligent electronic lock is locked and locked, the driving device 801 (motor) works to drive the rotating member 802 to rotate, thereby driving the telescopic member 803 to rotate, so that the toggle block 8031 on the telescopic member 803 is separated from the toggle device 806. That is, when the toggle device 806 is toggled outside the shell, a pressure cannot be applied to the toggle block 8031, so that the toggle device 806 is disabled.

This design greatly improves the safety of the lock and avoids the problem that anyone can unlock the lock at will.

At the same time, when you need to unlock the lock, you only need to scan the QR code. After obtaining the corresponding authorization authentication, the processor 500 controls the driving device 801 connected to it to work, so that the toggle block 8031 and the toggle device 806 cooperate. At this time, only the toggle device 806 needs to be gently pressed to separate the clamping device 805 from the electronic rope 600, and then one end of the electronic rope 600 can be pulled out to unlock the lock.

In some embodiments, the clamping device 805 includes:
  a clamping rod 8051, the clamping rod 8051 is rotatably connected to the telescopic member 803,
  a clamping wheel mounting seat 8052, which is fixedly connected to the upper end of the clamping rod 8051, and a clamping wheel 8053, the clamping wheel 8053 is rotatably connected to the clamping wheel mounting seat 8052, and when in contact with the electronic rope 600, a pressure is applied to the electronic rope 600, a clamping groove 80531 is provided on the contact surface of the clamping wheel 8053 and the electronic rope 600, and the width of the clamping groove 80531 gradually narrows along the circumference of the clamping wheel 8053, when the clamping groove 80531 is in contact with the electronic rope 600, when the electronic rope 600 is pulled outward, the clamping wheel 8053 rotates, and the clamping groove 80531 where the clamping wheel contacts the electronic rope 600 becomes narrower, so that the pressure between the clamping wheel and the electronic rope 600 becomes larger, so that the electronic rope cannot be pulled out.

Specifically, in this solution, the clamping groove 80531 is designed to gradually narrow along the circumference of the card wheel 8053. When the electronic rope 600 is violently pulled externally, the rope slowly moves outward. Driven by the electronic rope 600, the card wheel 8053 also correspondingly in the process of rotation, as the clamping groove 80531 gradually narrows, the two sides of the clamping groove 80531 will gradually continue to apply pressure to the electronic rope 600, so that the electronic rope 600 receives more and more pressure. The rope 600 is pulled tighter and tighter, avoiding the problem of violent pulling out.

In some embodiments, a second compression spring 8054 is provided outside the clamping rod 8051, one end of the second compression spring 8054 is in contact with the bottom of the clamping wheel 8052, and the other end is an upper end face of the telescopic member 803 is in contact.

Specifically, since the clamping rod 8051 is rotatably connected to the telescopic member 803, when the clamping wheel 8053 of the intelligent electronic lock is not locked in contact with the electronic rope 600, it may rotate left and right, which will cause the clamping wheel 8053 and the deviation of the electronic rope 600 will cause the problem of the reliability of the clamping part.

In this solution, the second compression spring 8054 is designed between the clamping rod 8051 and the bottom of the clamping mounting seat 8052, and an outward thrust is designed between the two through the second compression spring 8054, so that in a normal shaking state, the clamping rod 8051 will not rotate, which avoids the problem of position deviation between the clamping wheel 8053 and the electronic rope 600.

In some embodiments, the rotating member 802 is provided with an accommodating groove 8021, one end of the first compression spring 804 is arranged in the accommodating groove 8021, and the other end is connected to a lower end of the telescopic member 803.

In some embodiments, the telescopic member 803 comprises:

a main body 8032, the toggle block 8031 is arranged on the side of the main body 8032, and a guidepost 8033, one end of the guidepost 8033 is fixedly arranged on a lower end surface of the main body 8032, and the other end extends into the rotating member 802 and can move up and down along the rotating member 802, and cannot be completely separated from the rotating member 802.

In some embodiments, the toggle device 806 comprises:
a toggle groove 8061, the toggle groove 8061 is arranged on the intelligent electronic lock shell, and a toggle slider 8062, the toggle slider 8062 is provided with a toggle elastic block 80621 that cooperates with the toggle groove 8061, and the toggle elastic block 80621 passes through the toggle groove to movably connect the toggle slider 8062 on the intelligent electronic lock shell 100, the toggle slider 8062 can reciprocate along the toggle groove 8061.

After the toggle elastic block 8062 extends into the intelligent electronic lock shell 100, it is matched with the toggle block 8062 for applying pressure to the toggle block 8031.

Specifically, the toggle elastic block 80621 is a buckle, which can pass through the toggle groove 8061 after being squeezed and deformed, and after passing through the toggle groove 8061, it returns to its original shape, so that the toggle slider 8062 is snapped fixed in the toggle groove 8061.

In some embodiments, a recovery device 8063 is provided between the toggle slider 8062 and the intelligent electronic lock shell 100.

In some embodiments, the recovery device 806 comprises:

a first recovery chamber 8061, the first recovery chamber 8061 is arranged on the intelligent electronic lock shell 100.

a third compression spring 80632, the third compression spring 80632 is arranged in the first recovery chamber 8061, a return clip block 80633, the return clip block 80633 is arranged on the toggle slider 8062 and extends into the first recovery chamber 80632 to be matched with the third compression spring 80632.

In some embodiments, the fixed end connection structure 700 comprises:

a fixed cavity 701, the fixed cavity 701 is arranged on electronic lock shell 100, a fixed card 7011 interface and a positive and negative connection contact 7012 electrically connected with the intelligent electronic lock are arranged in the fixed cavity 700, A positive connection part 702, an upper end of the positive connection part 702 is provided with a positive connection through hole 7021 for the insertion of the electronic rope 600, and a positive connection groove (not shown in the figure) is provided on the side wall to be matched with the positive and negative connection contacts 7012 (not shown in the figure), the inner wall of the positive electrode connection through hole 7021 is electrically connected to the positive electrode connection groove (not shown in the figure), A negative connection part 703, the negative connection part 703 is arranged at the lower end of the positive connection part 702, and is insulated from the positive connection part 702, and the negative connection part 703 is provided with a negative connection through which the electronic rope 600 is inserted. A hole of the side wall is provided with a negative connection groove (not shown in the figure) that matches the positive and negative connection contacts 7012, and the inside wall of the negative connection through hole (not shown in the figure) is insulated from the negative connection groove (not shown in the figure), and the bottom of the negative connection through hole (not shown in the figure) is electrically connection with the bottom of the negative connection groove (not shown in the figure), and A fixed clamping portion 704, the fixed clamping portion 704 is provided at the lower end of the negative connection part 703, and the fixed clamping portion 704 is provided with an elastic fixing hook 7041 that cooperates with the fixed card interface 7011, The electronic rope 600 is fixed in the positive connection through hole 7021 and the negative connection through hole (not shown in the figure). The outer side wall of the electronic rope 600 is electrically connected to the positive connection through hole 7021, and the outer side wall of the electronic rope 600 is connected to the negative connection through hole (not shown in the figure) insulated connection, the inner core of the electronic rope 600 is electrically connected to the bottom of the negative connection through hole (not shown in the figure), The lower end of the fixed cavity 701 is provided with a first fixed cavity opening 7013 through which the positive connection part 702, the negative connection part 703 and the fixed clamping portion 704 pass, and the upper end of the fixed cavity 701 is provided with a first fixed cavity opening 7013. The second fixed cavity opening 7014 through which the connection part 702, the negative connection part 703, and the fixed clamping portion 704 cannot pass, The second fixed cavity opening 7014 can allow the electronic rope 600 to pass through.

Specifically, in this solution, the electronic rope 600 is inserted into the positive electrode connection through hole 7021 and the negative electrode connection through hole (not shown in the figure), the outer conductive rope is electrically connected and fixed to the inner wall of the positive electrode connection through hole 7021, and the electronic rope 600 The inner core and the bottom of the negative connection through hole (not shown in the figure) are electrically connected and fixed.

When the electronic rope 600 is violently cut, the loop is interrupted, and the lock can be used to automatically alarm. The specific principle is still referring to the disclosure patent titled an electronic lock rope and an electronic seal using the electronic lock rope. No longer.

In some embodiments, the positive connection part 702 and the negative connection part 703 are respectively provided with a first waterproof ring 705 and a second waterproof ring 706, the positive connection groove (not shown in the figure) and the negative connection groove (not shown in the figure) are located between the first waterproof ring 705 and the second waterproof ring 706.

Specifically, the design of the first waterproof ring 705 and the second waterproof ring 706 greatly avoids the problem of short circuit caused by moisture or water ingress.

In summary, the intelligent electronic lock includes an electronic lock shell 100, a wireless communication module 200, an infrared sensor 300, a display screen 400, which is arranged on the electronic lock shell 100 and is used for displaying a QR code, A processor 500, and an electronic rope 600, the electronic rope 600 is disposed on the electronic lock shell 100 and connected to the processor 500, one end of the electronic rope 600 is connected to the electronic lock shell 100 through a fixed end connection structure 700, and the other end is connected to the electronic lock shell 100 through the movable end connection structure 800. The invention uses a QR code to unlock the lock. When the lock needs to be unlocked, the lock can be unlocked only by scanning the code, and in the process of scanning the code, the information of the user can be recorded. Once a problem occurs, the accountability is quite convenient. Moreover, the design in this solution of the fixed-end connection structure 700 of makes it easy to replace the electronic rope 600 when the electronic rope 600 is damaged, without causing the problem of needing to replace the entire lock.

The above-mentioned embodiments only express one or more embodiments of the disclosure, and their descriptions are more specific and detailed, but they should not be interpreted as limiting the scope of the disclosure. It should be noted that for those of ordinary skill in the art, without departing from the concept of the disclosure, several modifications and improvements can also be made, which all fall within the protection scope of the disclosure. Therefore, the protection scope of the disclosure shall be subject to the appended claims.

What is claimed is:

1. An intelligent electronic lock, comprising:
   an electronic lock shell,
   a wireless communication module, which is arranged in the electronic lock shell, and is configured to be communicated wirelessly with a server,
   an instruction input device, which is arranged on the electronic lock shell and is used for instruction input,
   a processor, which is connected to the wireless communication module and the instruction input device for generating a corresponding signal according to the instruction input, and
   an electronic rope, which is arranged on the electronic lock shell and connected with the processor,
   wherein one end of the electronic rope is connected to the electronic lock shell through a fixed end connection structure, and the other end is connected to the electronic lock shell through a movable end connection structure,
   the movable end connection structure includes:
   a driving device, which is arranged in the intelligent electronic lock and connected to the processor, the processor being configured to control the driving device to work,
   a rotating member, which is connected with the driving device and is rotatable through being driven by the driving device,
   a telescopic member, which is arranged on the rotating member, is rotatable together with the rotating member, and is capable of being reciprocated along a height direction of the rotating member through being driven by the driving device, and the telescopic member and the rotating member are not completely separated in the reciprocating motion along the height direction of the rotating member, a toggle block extending outward is provided on a side of the telescopic member,
   a first compression spring, which is arranged between the rotating member and the telescopic member, and is a compressed state,
   a clamping device, which is rotatably connected to the telescopic member, and is capable of being reciprocated along the height direction of the rotating member together with the telescopic member, when the clamping device is pushed up, the clamping device is cooperated with the electronic rope to apply a pressure to the electronic rope so that the electronic rope cannot be pulled out, and
   a toggle device, which is movably arranged on intelligent electronic lock shell, when the toggle device cooperates with the toggle block, the toggle device is capable of moving the toggle block downwards when a pressure is applied to the toggle device, so that the clamping device is separated from the electronic rope.

2. The intelligent electronic lock according to claim 1, wherein the clamping device comprises:
   a clamping rod, the clamping rod is rotatably connected to the telescopic member, a clamping wheel mounting seat, which is fixedly connected to the upper end of the clamping rod, and
a clamping wheel, the clamping wheel is rotatably connected to the clamping wheel mounting seat, and when in contact with the electronic rope, a pressure is applied to the electronic rope,
a clamping groove is provided on the contact surface of the clamping wheel and the electronic rope, and the width of the clamping groove gradually narrows along the circumference of the clamping wheel,
when the clamping groove is in contact with the electronic rope, when the electronic rope is pulled outward, the clamping wheel rotates, and the clamping groove where the clamping wheel contacts the electronic rope becomes narrower, so that the pressure between the clamping wheel and the electronic rope becomes larger, so that the electronic rope cannot be pulled out.

3. The intelligent electronic lock according to claim 2, wherein a second compression spring is provided outside the clamping rod, one end of the second compression spring is in contact with the bottom of the clamping wheel, and the other end is an upper end face of the telescopic member is in contact.

4. The intelligent electronic lock according to claim 1, wherein the rotating member is provided with an accommodating groove, one end of the first compression spring is arranged in the accommodating groove, and the other end is connected to a lower end of the telescopic member.

5. The intelligent electronic lock according to claim 1, wherein the telescopic member comprises:
a main body, the toggle block is arranged on the side of the main body, and
a guidepost, one end of the guidepost is fixedly arranged on a lower end surface of the main body, and the other end extends into the rotating member, and can move up and down along the rotating member, and cannot be completely separated from the rotating member.

6. The intelligent electronic lock according to claim 1, wherein the toggle device comprises:
a toggle groove, the toggle groove is arranged on the intelligent electronic lock shell, and
a toggle slider, the toggle slider is provided with a toggle elastic block that cooperates with the toggle groove, and the toggle elastic block passes through the toggle groove to movably connect the toggle slider on the intelligent electronic lock shell, the toggle slider can reciprocate along the toggle groove,
after the toggle elastic block extends into the intelligent electronic lock shell, it is matched with the toggle block for applying pressure to the toggle block.

7. The intelligent electronic lock according to claim 6, wherein a recovery device is provided between the toggle slider and the intelligent electronic lock shell.

8. The intelligent electronic lock according to claim 7, wherein the recovery device comprises:
the first recovery chamber, the first recovery chamber is arranged on the shell of the intelligent electronic lock,
a third compression spring, the third compression spring is arranged in the first recovery chamber,
a return clip block, the return clip block is arranged on the toggle slider and extends into the first recovery chamber to be matched with the third compression spring.

9. The intelligent electronic lock according to claim 1, wherein the fixed end connection structure comprises:
a fixed cavity, the fixed cavity is arranged on electronic lock shell, a fixed card interface and a positive and negative connection contacts electrically connected with the intelligent electronic lock are arranged in the fixed cavity,
a positive connection part, an upper end of the positive connection part is provided with a positive connection through hole for inserting the electronic rope, a positive connection groove matched with the positive and negative connection contacts is provided on the side wall, an inner side wall of the positive connection through hole is electrical connection with the positive connection groove;
a negative connection part, the negative connection part is arranged at a lower end of the positive connection part and is insulated from the positive connection part, the negative connection part is provided with a negative connection through hole for inserting the electronic rope, and there is a negative connection groove matched with the positive and negative connection contacts in a side wall, an inner side wall of the negative connection through hole is insulated from the negative connection groove, and a bottom of the negative connection through hole is connected to the negative connection groove through the electrical connection, and
a fixed clamping portion, the fixed clamping portion is arranged at a lower end of the negative connection part, and the fixed clamping portion is provided with an elastic fixing hook that cooperates with the fixed card interface,
the electronic rope is fixed in the positive connection through hole and the negative connection through hole, the outer side wall of the electronic rope is electrically connected with the positive connection through hole, an outer side wall of the electronic rope is insulated and connected with the negative connection through hole, and an inner core of the electronic rope is electrically connected to a bottom of the negative connection through hole,
the lower end of the fixed cavity is provided with a first fixed cavity opening through which the positive connection part, the negative connection part and the fixed clamping portion pass, and an upper end of the fixed cavity is provided with a second fixed cavity opening through which the positive connection portion and the negative connection part and the fixed clamping part cannot pass through,
the second fixed cavity opening allow the electronic rope to pass through.

10. The intelligent electronic lock according to claim 1, wherein the positive connection part and the negative connection part are respectively provided with a first waterproof ring and a second waterproof ring, the positive connection groove and the negative connection groove are located between the first waterproof ring and the second waterproof ring.

* * * * *